W. V. ISGRIG.
CLAMP.
APPLICATION FILED JULY 9, 1920.
1,394,904. Patented Oct. 25, 1921.
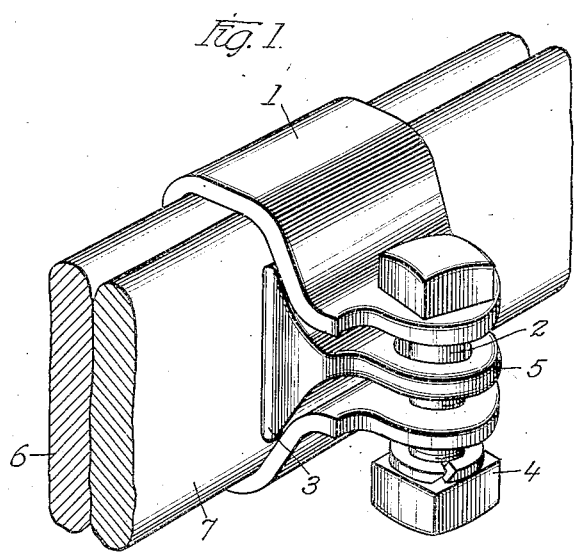
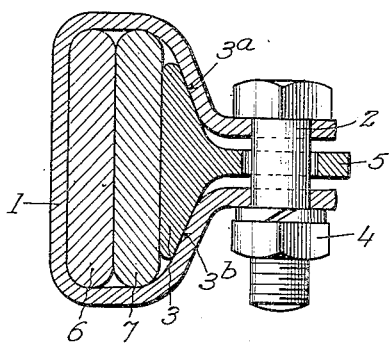
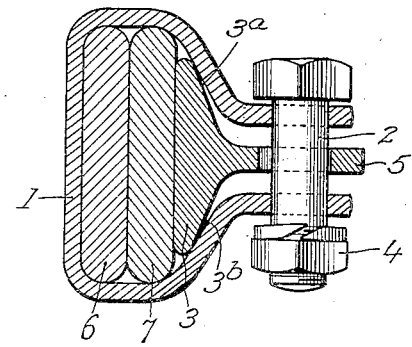
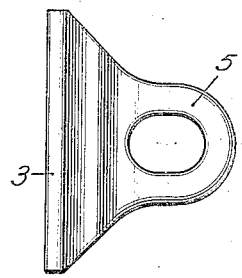
Inventor
Walter V. Isgrig

UNITED STATES PATENT OFFICE.

WALTER V. ISGRIG, OF MILWAUKEE, WISCONSIN, ASSIGNOR TO BADGER MANUFACTURING CORPORATION, OF MILWAUKEE, WISCONSIN, A CORPORATION OF DELAWARE.

CLAMP.

1,394,904.  Specification of Letters Patent.  Patented Oct. 25, 1921.

Application filed July 9, 1920. Serial No. 395,096.

*To all whom it may concern:*

Be it known that I, WALTER V. ISGRIG, a citizen of the United States, residing at Milwaukee, in the county of Milwaukee and State of Wisconsin, have invented new and useful Improvements in Clamps, of which the following is a specification.

This invention relates to a clamp.

It is particularly applicable for clamping together two spring bars of an automobile bumper, although not limited to such use.

Heretofore, in clamps in which the ends of a strap are drawn together, a portion of the strap near the ends usually remains spaced from the bar. For this reason, the full length of the strap is not effectually utilized for gripping the object to which it is applied. Such an arrangement is undesirable when used to clamp automobile bumper bars because continued vibration tends to loosen the strap, thus destroying the gripping action and permitting relative movement between the parts. This ofttimes results in objectionable rattling.

One of the objects of this invention is to provide an improved clamp for effectively gripping and maintaining parts in position.

Another object is to provide means for securing a powerful gripping action as the clamp is tightened.

Another object is to provide simple and efficient means for clamping a plurality of members together.

Another object is to provide means occupying the space between the ends of the strap and exerting a wedging or gripping action on an object as the ends of the strap are drawn together.

Another object is to provide means for exerting a wedging action between a portion of the clamp and a member held thereby, when the clamp is tightened.

Another object is to provide means for exerting a wedging or gripping action upon members held within the clamp.

Another object is to provide a clamp in which the parts are arranged to form a self contained unit.

Other objects and advantages will hereinafter appear.

In accordance with the invention, the clamp comprises a strap, means for tightening the strap on the member to be held by the clamp, and spacing means positioned between the strap and clamped member and coöperating with the strap to effect a powerful wedging or gripping action as the clamp is tightened.

An embodiment of the invention is illustrated in the accompanying drawings, in which:

Figure 1 is a perspective of the clamp holding together the two spring bars of an automobile bumper;

Fig. 2 is a section of the clamp in clamping position;

Fig. 3 is a similar section of the clamp in non clamping position.

Fig. 4 is a side elevation of the spacer.

The clamp comprises a holding strap 1, a bolt 2 for tightening the strap, and a spacing member 3 coöperating with the strap and bolt.

The strap 1 is formed of a strip of iron or steel or other suitable metal, and is provided with openings near the ends thereof for receiving the tightening bolt 2.

The bolt 2 is of the usual construction and its shank extends through the openings in the strap. A nut 4 and suitable washer coöperates with the nut in tightening the strap. Other means may, of course, be employed for tightening the strap.

The spacer 3 has a flat bottom for engaging the surface of the member to be gripped by the clamp. The upwardly extending arm 5 of the spacer is provided with an opening through which extends the shank of the bolt. The spacer has sloping sides $3^a$ and $3^b$ which coöperate with the strap when the bolt tightens the same.

The clamp may be employed to hold in relative fixed position the two spring bars 6 and 7 of an automobile bumper.

When so employed the strap embraces the two bars and the flat bottom of the spacer rests on the upper surface of the bar 7. The bolt passes through the alined openings in the strap and the spacer. Before the nut 4 is tightened up on the bolt 2 the shank thereof is in the upper end of the elongated opening in the spacer.

As the nut 4 is screwed up on the bolt 2 the ends of the strap 1 are drawn nearer together, bringing the inner surface of the strap into contact with the sloping sides $3^a$ and $3^b$ of the spacer 3.

When the clamp is closed as shown in Fig. 2, the shank of the bolt is positioned near the lower end of the elongated opening in the spacer, and the spring bars 6 and 7 of the automobile bumper are tightly clamped between the base of the strap and the spacer 3.

The spacer acts as a stop against which the upper bar 7 is forced or wedged by the strap as the same is tightened by the bolt. Thus the bars 6 and 7 or other members to be held by the clamp are firmly gripped between the strap and the spacer.

By the use of the spacer, which also acts as a wedge between the strap and the member or members to be held by the clamp, the member is more tightly gripped or clamped than when employing merely the ordinary strap and bolt. The introduction of the spacer enables the clamp to exert a powerful gripping action whereby the clamp effectively holds the members together so that the same are not readily displaced.

The particular embodiment of the invention shown and described herein is for the purpose of illustration only and is therefore to be considered in an illustrative and not in a limiting sense, for it is obvious that many changes and adaptations will readily occur to and may be made by those skilled in the art without departing from the spirit and scope of the invention.

What is claimed is:

1. A clamp comprising a strap adapted to receive a member, securing means for drawing the ends of the strap together, and spacing means coöperating therewith to cause wedging action between the strap and said member, as the securing means is tightened.

2. A clamp comprising a strap adapted to grip a member, securing means at the end of the strap, and a spacing member coöperating to cause a wedging action with the strap and the member gripped when the securing means is tightened.

3. In a clamp comprising a holding means and tightening means at the ends thereof, a spacer adapted to coöperate with the holding and tightening means to grip an object.

4. In a clamp comprising a strap adapted to hold members and securing means for the strap, a spacing member arranged between the ends of the strap to exert a gripping action between the members as the ends of the strap are drawn together.

5. In a clamp, the combination of a strap adapted to receive an object, tightening means for the strap, and an independently movable spacing member arranged between the ends of the strap, and adapted to exert a gripping action between the strap and the member as the ends of the strap are drawn together.

6. In a clamp comprising a strap adapted to hold a member, and tightening means including a bolt passing through openings in the end of said strap, a spacer having oppositely tapering sides adapted to engage opposite ends of the strap, and an arm projecting from said spacer and having an opening therein adapted to receive said bolt.

7. A clamp comprising a strap adapted to hold a member, securing means passing through the ends of the strap, and spacing means associated with the securing means and adapted to occupy the space between the ends of the strap to coöperate therewith and exert a gripping action upon the member as the securing means are tightened.

8. A clamp comprising holding means, securing means at the ends thereof, and an independently movable spacer having an inclined surface coöperating with the holding means to cause a wedging action between the holding means and the spacer when the clamp is tightened.

In witness whereof, I have hereunto subscribed my name.

WALTER V. ISGRIG.